(12) United States Patent
Lamy

(10) Patent No.: US 10,807,270 B2
(45) Date of Patent: Oct. 20, 2020

(54) METHOD FOR MAKING A WINDOW IN A THIN PLASTIC LAYER

(71) Applicant: IDEMIA FRANCE, Colombes (FR)

(72) Inventor: Nicolas Lamy, Colombes (FR)

(73) Assignee: IDEMIA FRANCE, Colombes (FR)

( * ) Notice: Subject to any disclaimer, the term of this patent is extended or adjusted under 35 U.S.C. 154(b) by 67 days.

(21) Appl. No.: 16/062,980

(22) PCT Filed: Dec. 16, 2016

(86) PCT No.: PCT/FR2016/053529
§ 371 (c)(1),
(2) Date: Jun. 15, 2018

(87) PCT Pub. No.: WO2017/103541
PCT Pub. Date: Jun. 22, 2017

(65) Prior Publication Data
US 2018/0370062 A1 Dec. 27, 2018

(30) Foreign Application Priority Data
Dec. 17, 2015 (FR) ...................................... 15 62684

(51) Int. Cl.
*B26D 7/27* (2006.01)
*B26D 7/18* (2006.01)
(Continued)

(52) U.S. Cl.
CPC ............. *B26D 7/27* (2013.01); *B26D 7/1818* (2013.01); *B26D 9/00* (2013.01); *B26F 1/40* (2013.01);
(Continued)

(58) Field of Classification Search
CPC .......... B26D 7/27; B26D 9/00; B26D 7/1818; B32B 27/304; B32B 27/365; B32B 3/08;
(Continued)

(56) References Cited

U.S. PATENT DOCUMENTS 3,623,209 A * 11/1971 Zuhlke et al. ......... A61B 1/247
29/413
3,874,979 A * 4/1975 Hannon ................. B32B 37/142
428/13
(Continued)

FOREIGN PATENT DOCUMENTS

EP 2886267 A1 6/2015
GB 2267247 A * 12/1993
(Continued)

OTHER PUBLICATIONS

International Search Report, dated Apr. 7, 2017, from corresponding PCT/FR2016/053529 application.

*Primary Examiner* — Christopher T Schatz
*Assistant Examiner* — Cynthia L Schaller
(74) *Attorney, Agent, or Firm* — Nixon & Vanderhye

(57) ABSTRACT

Disclosed is a method for making a window in a thin plastic accommodating layer by inserting an insert from a thin plastic supply layer, the method including the following steps: cutting an opening in the accommodating layer according to the shape of the future window, punching the supply layer to produce an insert and inserting the insert into the opening, wherein the punching and at least one first phase of insertion are carried out in a single movement of a single punching and inserting tool, in a direction going from the supply layer to the accommodating layer.

17 Claims, 6 Drawing Sheets

(51) Int. Cl.
| | |
|---|---|
| B26F 1/40 | (2006.01) |
| B32B 27/06 | (2006.01) |
| B32B 27/36 | (2006.01) |
| B32B 27/28 | (2006.01) |
| B32B 27/32 | (2006.01) |
| B32B 3/08 | (2006.01) |
| B32B 27/30 | (2006.01) |
| B42D 25/455 | (2014.01) |
| B42D 25/46 | (2014.01) |
| B42D 25/475 | (2014.01) |
| B26D 9/00 | (2006.01) |
| B32B 38/00 | (2006.01) |
| B42D 25/23 | (2014.01) |
| B42D 25/351 | (2014.01) |

(52) U.S. Cl.
CPC ............... *B32B 3/08* (2013.01); *B32B 27/06* (2013.01); *B32B 27/28* (2013.01); *B32B 27/304* (2013.01); *B32B 27/322* (2013.01); *B32B 27/36* (2013.01); *B32B 27/365* (2013.01); *B32B 38/0004* (2013.01); *B42D 25/455* (2014.10); *B42D 25/46* (2014.10); *B42D 25/475* (2014.10); *B32B 2250/02* (2013.01); *B32B 2250/03* (2013.01); *B32B 2250/40* (2013.01); *B32B 2307/412* (2013.01); *B32B 2307/414* (2013.01); *B32B 2425/00* (2013.01); *B42D 25/23* (2014.10); *B42D 25/351* (2014.10)

(58) Field of Classification Search
CPC ....... B32B 27/322; B32B 27/28; B32B 27/36; B32B 27/06; B32B 38/0004; B32B 2250/40; B32B 2307/414; B32B 2250/03; B32B 2307/412; B32B 2250/02; B32B 2425/00; B42D 25/475; B42D 25/46; B42D 25/455; B42D 25/351; B42D 25/23; B26F 1/40
See application file for complete search history.

(56) References Cited

U.S. PATENT DOCUMENTS

| | | | |
|---|---|---|---|
| 4,916,798 A | * | 4/1990 | Ballast ................. B21D 39/032 264/249 |
| 2016/0257019 A1 | | 9/2016 | Baist |
| 2016/0318203 A1 | | 11/2016 | Roussel et al. |

FOREIGN PATENT DOCUMENTS

| | | |
|---|---|---|
| JP | H11239999 A | 9/1999 |
| WO | 2015/104011 A1 | 7/2015 |

* cited by examiner

METHOD FOR MAKING A WINDOW IN A THIN PLASTIC LAYER

The present invention relates to the production of a window in a layer made of thin plastic, referred to as receiving layer, by insertion of a pellet originating from another layer of thin plastic, referred to as supply layer.

Such production makes it possible to produce, in a receiving layer, a window having different properties, for example in terms of material or color. One particular embodiment makes it possible to obtain, with a suitable supply layer, a transparent or translucent window.

EP 2886267 discloses a three-step method. A tool, comprising a sharp hollow punch at its periphery, corresponding to the contour of the pellet, is used during a first step to cut a pellet out of a supply layer. The pellet remains in the recess of the hollow punch after cutting. During a second step, the tool is moved and repositioned in an opening previously cut out of a receiving layer. The tool also has a plunger that is disposed in the recess of the hollow punch and is used, during a third step, to position the pellet in the opening.

Such a method has the drawback of a complex tool. Moreover, repositioning the tool in the opening has to be particularly precise in order for the hollow punch not to cut the receiving layer.

The present invention remedies these various drawbacks and proposes a simpler alternative solution.

The subject of the invention is a method for producing a window in a receiving layer made of thin plastic by insertion of a pellet originating from a supply layer made of thin plastic, comprising the following steps of: cutting an opening in the receiving layer in the shape of the future window, punching the supply layer to produce a pellet, and inserting the pellet into the opening, wherein the punching and at least a first phase of the insertion are realized in a single movement of a single punching and insertion tool, in a direction from the supply layer to the receiving layer.

According to another feature, the punching and insertion tool comprises a flat punch.

According to another feature, a counterpart tool coaxial with the punching and insertion tool, and on the opposite side relative to the receiving layer, cooperates with the punching and insertion tool and prevents the pellet from moving, in order to position the pellet in the opening.

According to another feature, the insertion step comprises a step of pushing the pellet beyond its end position, followed by a step of pushing back in the opposite direction.

According to another feature, the shape of the pellet is substantially identical to the shape of the opening, and the thickness of the supply layer is substantially the same as the thickness of the receiving layer.

According to another feature, the material of the pellet is transparent.

According to another feature, the receiving layer and supply layer are disposed horizontally.

According to another feature, the receiving layer and supply layer are disposed vertically.

According to another feature, the cutting tool is coincident with the punching and insertion tool and works through the supply layer.

According to another feature, the cutting tool is separate from the punching and insertion tool.

According to another feature, the cutting tool is coaxial with the punching and insertion tool and on the opposite side relative to the receiving layer and supply layer.

According to another feature, the cutting tool and the counterpart tool are coincident.

According to another feature, a cut chip is evacuated through the supply layer.

According to another feature, a cut chip is evacuated between the receiving layer and the supply layer.

The invention also relates to a device obtained by such a method.

The invention also relates to a method for manufacturing an ID card having at least one receiving layer and two transparent outer layers, the method comprising the steps for producing a window, followed by a step of laminating the outer layers and the receiving layer.

Further features, details and advantages of the invention will become more clearly apparent from the following detailed description, which is given by way of indication with regard to the drawings, in which:

FIG. 1 illustrates the initial state,

FIG. 2 illustrates the punching step,

FIG. 3 illustrates the insertion step,

Figure 5:
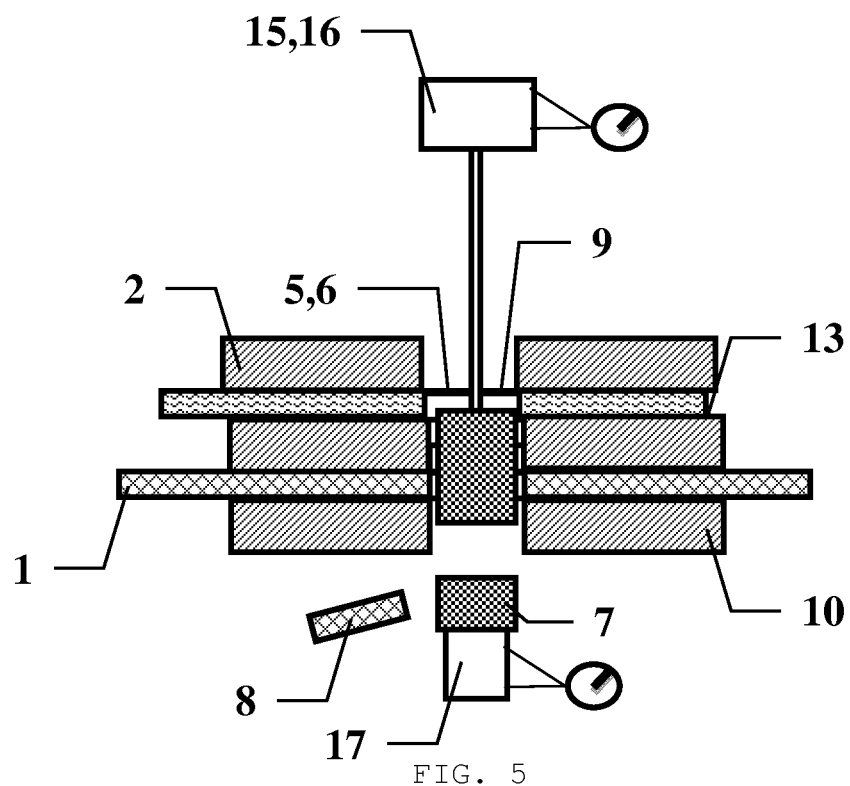
Figure 6:
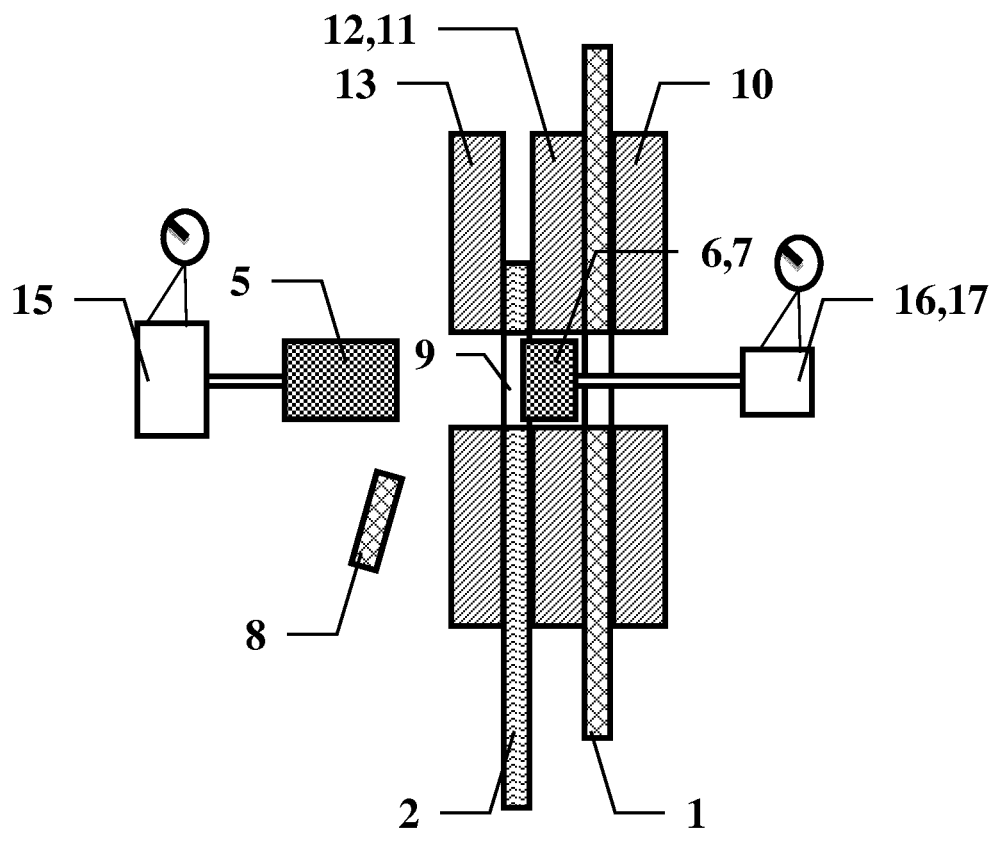
Figure 7:
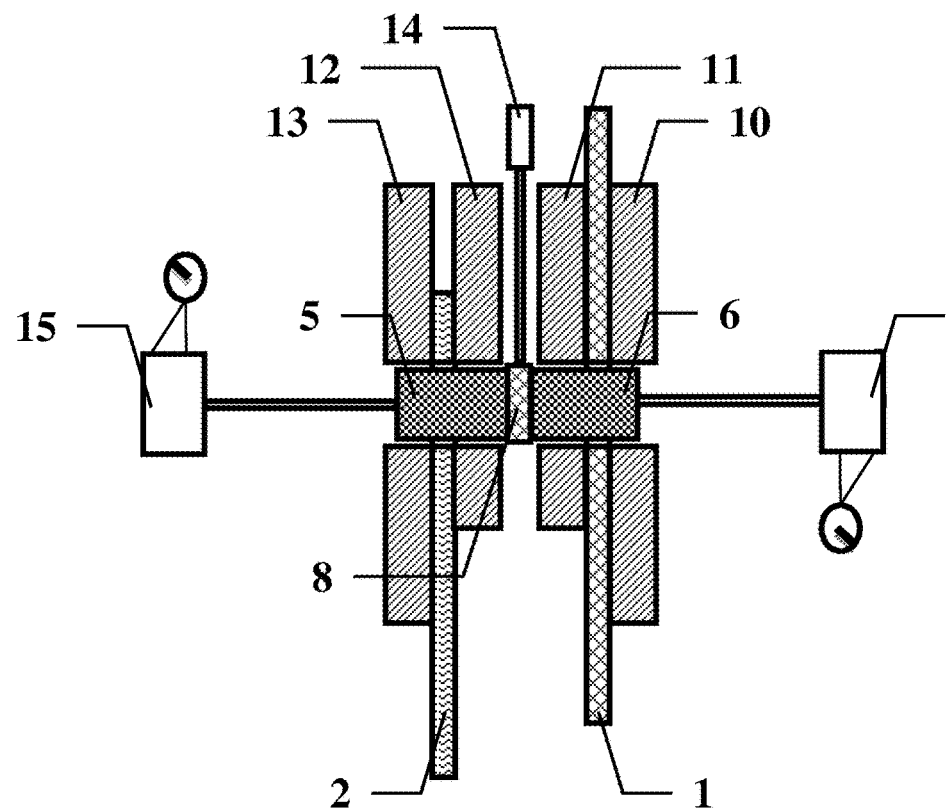
Figure 8:
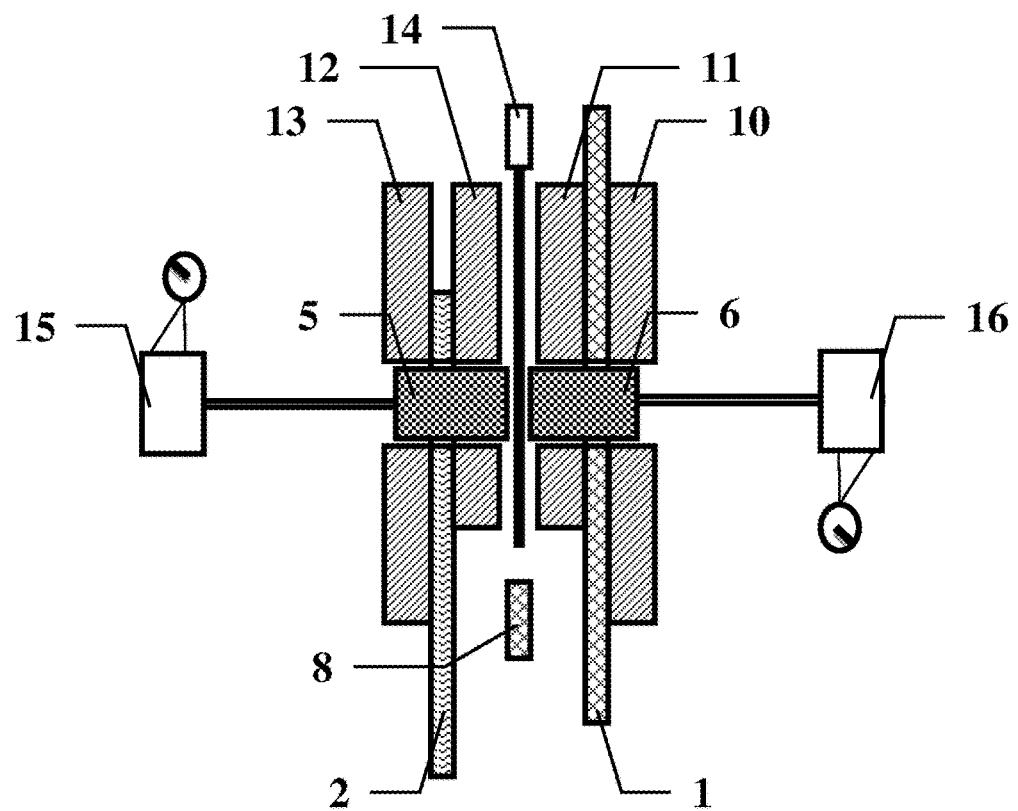
Figure 9:
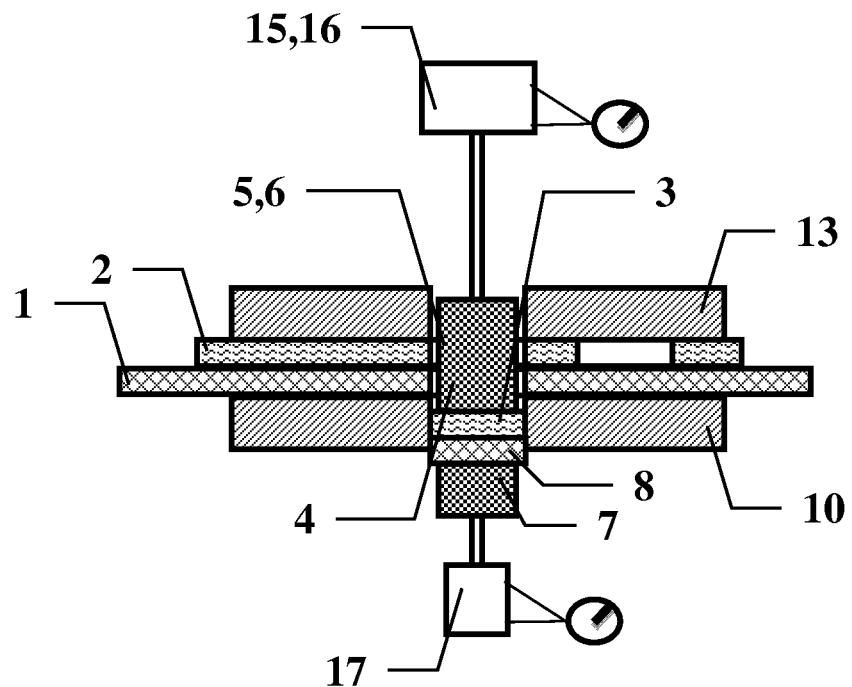
Figure 10:
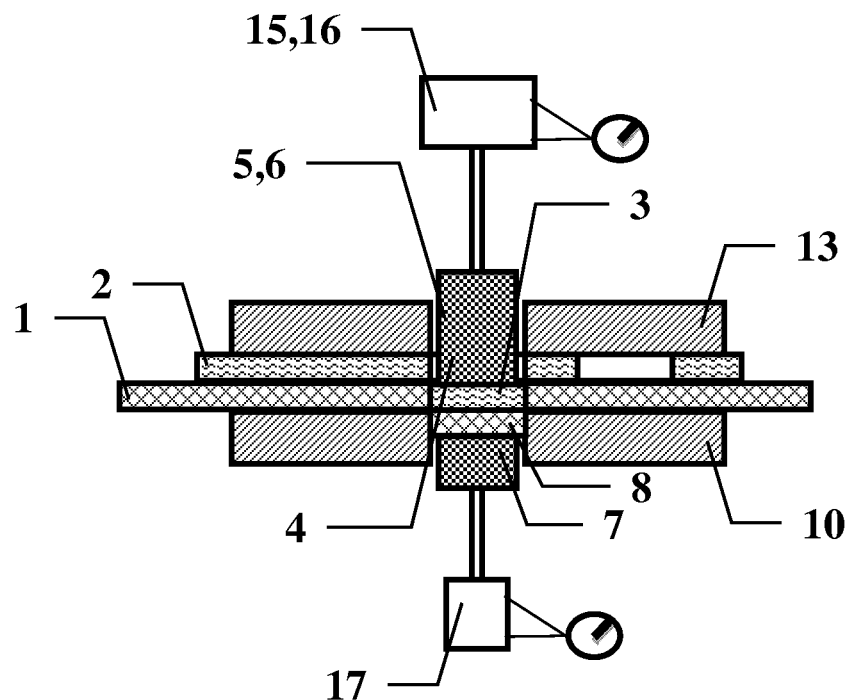
Figure 11:
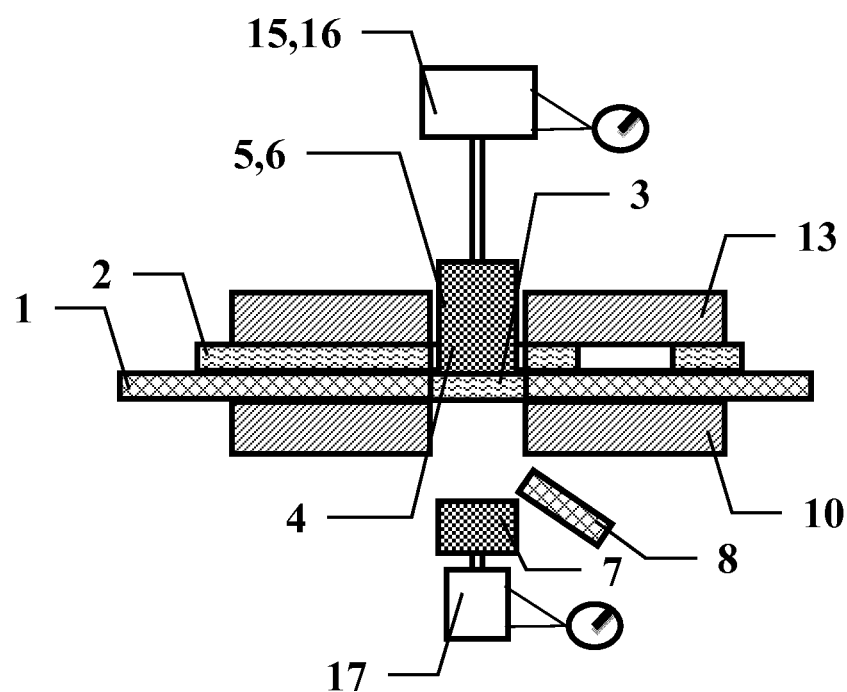
Figure 12:
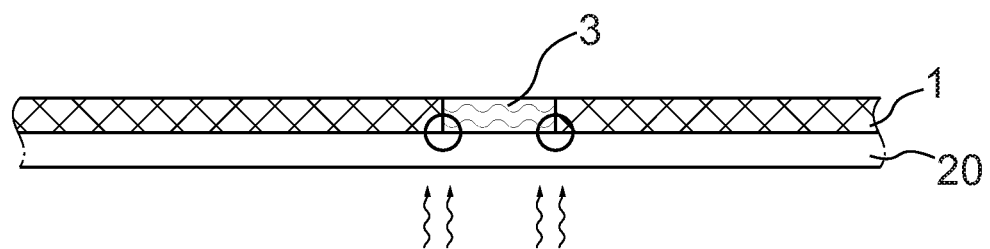

FIG. 5 illustrates the cutting of an opening according to a first embodiment, FIG. 6 illustrates the cutting of an opening according to another embodiment, and ejection of a chip through the supply layer, FIGS. 7 and 8 illustrate another manner of chip ejection, FIGS. 9-11 illustrate the cutting of an opening simultaneously with the insertion, FIG. 12 illustrates an example of connection between a pellet inserted into an opening and a covering layer.

The objective of the method is to produce a window in a layer 1 made of thin plastic, denoted receiving layer 1. This is produced by inserting a pellet 3 originating from another layer made of thin plastic, denoted supply layer 2.

The method applies very particularly to the manufacturing of identity documents, such as an ID card or a driver's license, having a small thickness of less than 1 mm. Traditionally, identity documents having such a thin plastic layer have the dimensions specified in the standard ISO7810, namely 85.6 mm*53.98 mm*0.76 mm.

Figure 1:
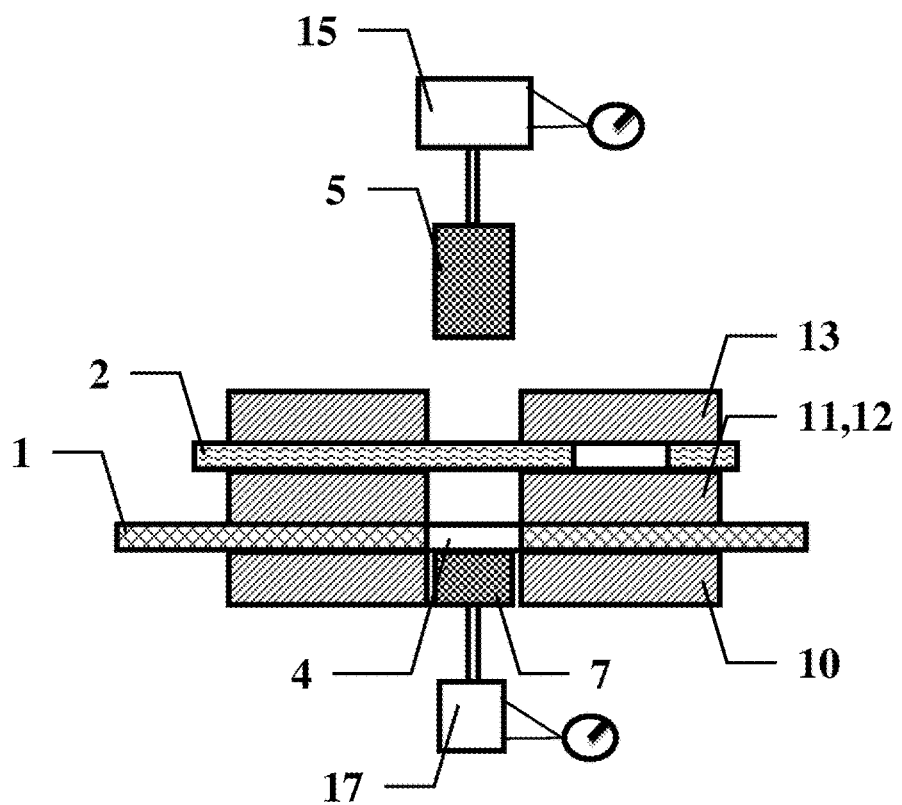
FIGS. 1 to 3 illustrate two main steps of the method.
Figure 2:
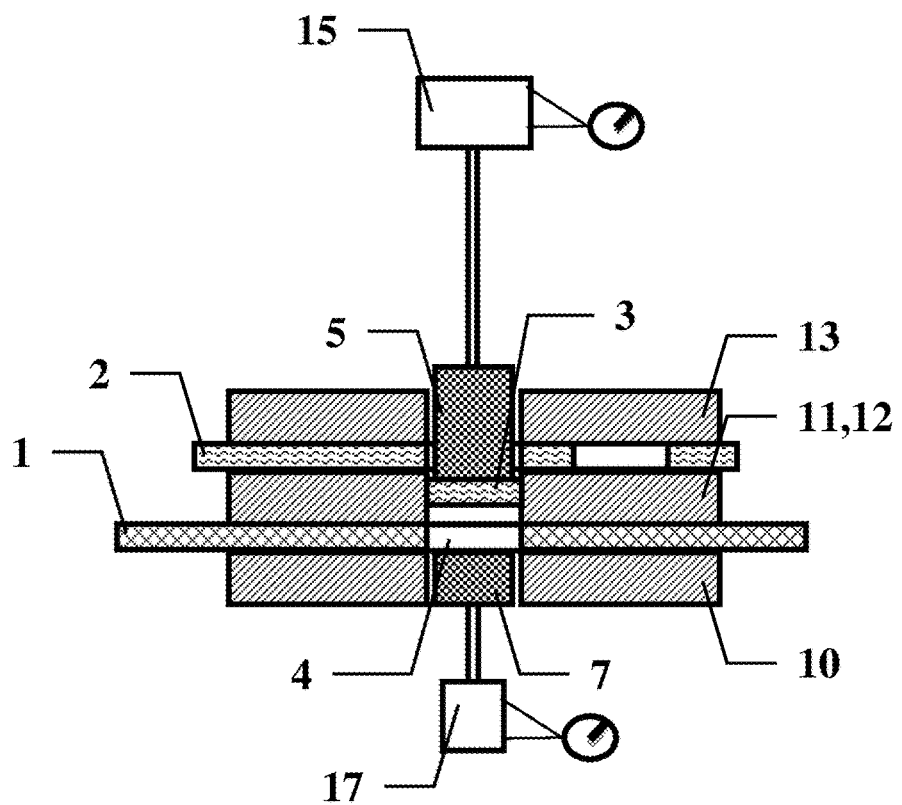
Figure 3:
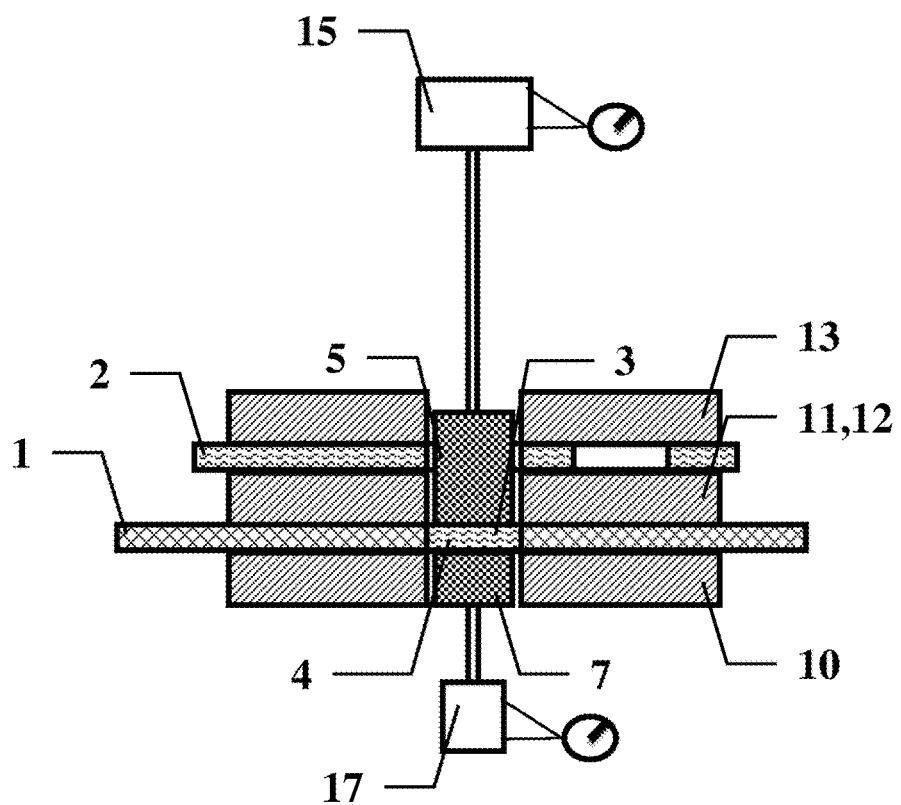

FIGS. 1-3 illustrate two essential steps of the method.

FIG. 1 illustrates the prior state. The receiving layer 1 and supply layer are disposed in a manner facing one another. They are fixed in position by a set of dies and clamps 10-13, described below. The receiving layer 1 has a through-cavity 4, referred to as "opening" 4 in the rest of the description, the contour shape of which corresponds to the desired shape for the future window. A tool 5, with its maneuvering means 15, is disposed opposite the opening 4. The supply layer 2 is positioned between the tool 5 and the opening 4.

FIG. 2 illustrates a step during which an operation of punching the supply layer 2 in order to produce a pellet 3 is carried out.

FIG. 3 illustrates a final step during which an operation of inserting this pellet 3 into the opening 4 in the receiving layer 1 is carried out.

One feature of the invention is that the two operations of punching and insertion are carried out virtually simultaneously in a single movement, in a direction from the supply layer 2 to the receiving layer 1. Moreover, these two operations are carried out by means of a single punching and insertion tool 5.

Since the operations are carried out from the supply layer 2 to the receiving layer 1, the punching and insertion tool 5 is initially disposed on the side of the supply layer 2.

According to one advantageous embodiment, the punching is carried out by shearing the material of the supply layer 2. For this purpose, according to one embodiment, the tool 5 advantageously comprises a substantially flat punch.

As can be seen more particularly from FIGS. 1-3, a counterpart tool 7, with its maneuvering means 17, can advantageously be employed in the method. Such a counterpart tool 7 is then disposed substantially coaxially with the punching and insertion tool 5 and on the opposite side relative to the receiving layer 1. Such a counterpart tool 7 can advantageously cooperate with the tool 5 and, by opposing the movement of the pellet 3, make it possible to position said pellet 3 depthwise in the receiving layer 1. The desired end position for the pellet 3 is such that the two faces of the pellet 3 are both flush with the faces of the receiving layer 1.

For this purpose, as is the case at the end of the insertion operation, the useful surface of the counterpart tool 7 is advantageously substantially flush with the surface of the receiving layer 1, on the opposite side from the tool 5.

The counterpart tool 7 can be active in that it is moved like a ram. It may also be passive or compliant. Thus, its compliance can make it possible to absorb the energy of the tool 5, while ensuring that it returns flush with the surface of the receiving layer 1.

According to one embodiment, the pellet 3 originating from the supply layer 2 is pushed only into its end position, inserted in the receiving layer 1, where it is, for example, stopped depthwise by the counterpart tool 7.

Punching of the material of the supply layer 2 by shearing has the drawback of potentially producing a thread of material following tearing by the punching tool 5.

Such a thread is not problematic, in that it is scarcely visible when the material of the pellet 3 is transparent.

According to one alternative embodiment, in order to eliminate this thread of material, it is possible to proceed as follows. The insertion operation is broken down into two stages. In a first stage, a step of pushing the pellet 3 in the direction from the supply layer 2 to the receiving layer 1 is carried out. As before, this pushing is continued until the pellet 3 reaches its end position, in which it is flush with the surface of the receiving layer 1. However, this pushing is continued such that the pellet 3 passes beyond said end position and at least partially protrudes from the receiving layer 1.

Figure 4:
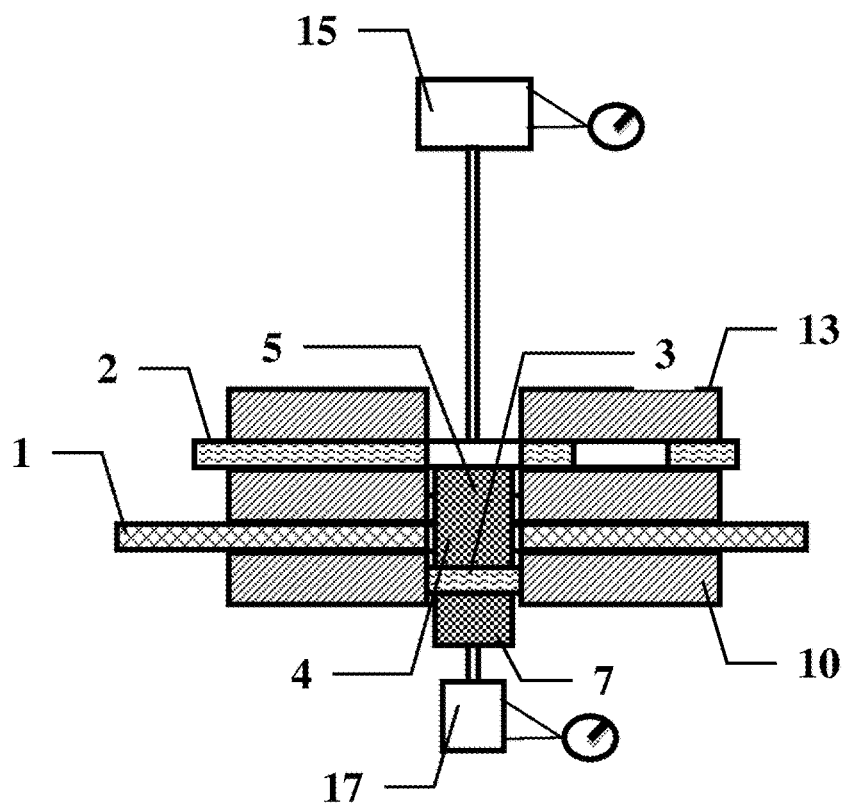
FIG. 4 illustrates an optional step and strip re-entry.

FIG. 4 illustrates this optional step, which, in this case, fits chronologically between FIGS. 2 and 3.

The pushing step is followed by a step of pushing back in the opposite direction, i.e. in the direction from the receiving layer 1 to the supply layer 2, until the pellet 3 finally reaches its end position.

According to the invention, pushing is carried out by the punching and insertion tool 5. Pushing back can typically be carried out, if present, by a counterpart tool 7, which is passive or active.

This insertion operation carried out in two opposite directions, in a back-and-forth movement, produces what is also known as "strip re-entry" and makes it possible to eliminate any thread of material.

According to one feature, the pellet 3, and, together therewith, the punching tool 5, has a shape substantially identical to the shape of the opening 4. Similarly, the thickness of the supply layer 2, and, together therewith, the thickness of the pellet 3 which originates therefrom, is substantially the same as the thickness of the receiving layer 1, and, together therewith, the thickness of the opening 4. Thus, the pellet 3 naturally has the dimensions of the opening 4 in which it will be positioned.

This does not have to be the case. According to an alternative embodiment, if the material allows a certain amount of creep, if appropriate hot creep, the pellet can have a surface area in the plane of the layers 1, 2 that is less than that of the opening 4. The pellet 3, and, together therewith, the supply layer 2, then advantageously has an increased thickness, such that the pellet 3 retains a constant volume, equal to the volume of the opening 4. During insertion, or during a subsequent step, pressing, or calendering, if appropriate limited to the window, is carried out so that the pellet 3 creeps and takes up the entire volume of the opening 4.

The receiving layer 1 and the supply layer 2 advantageously have a thickness at least equal to 300 µm and preferably between 400 and 600 µm.

The receiving layer 1 and the supply layer 2 are advantageously made of polycarbonate, PC. They may also be made of any other plastic material, such as: PVC, PEC, PETF, PETG, etc.

The method is advantageously such that the material of the pellet 3 can have a different property than that of the receiving layer 1. The method thus makes it possible to locally transfer this property to the window. The method can also be used to repair a receiving layer 1, if appropriate with an identical material.

Said property may be linked to the material, to the color, to a physical characteristic, for example electrical conductivity, or a chemical characteristic, such as the presence of doping that makes it possible to react to a laser, etc. In order for the pellet 3 to inherit this property, it is appropriate for the supply layer 2 to have this property throughout, or at least in the regions from which the pellets 3 are punched.

One particular property of the pellet 3 is that of being transparent, or translucent. The method thus advantageously makes to possible to produce a transparent, or translucent, window in a receiving layer 1.

As illustrated in FIGS. 1-5, the method may be carried out with the receiving layer 1 and supply layer 2 disposed horizontally. In this case, the axes of the tools 5, 6, 7 are substantially perpendicular to the layers 1, 2, i.e. substantially vertical.

Alternatively, as illustrated in FIGS. 6-8, and in an entirely interchangeable manner, and for all the embodiments described, the method may be carried out with the receiving layer 1 and supply layer 2 disposed vertically. In this case, the axes of the tools 5, 6, 7 are substantially perpendicular, i.e. substantially horizontal.

The embodiments in which the layers 1, 2 are vertical have the advantage that said layers 1, 2 stretch spontaneously under the effect of the weight, thereby avoiding any prejudicial curve.

In order for the pellet 3 to be able to be inserted, it is appropriate, prior to insertion, to cut the opening 4. This cutting is carried out in the receiving layer 1. The shape cut for the opening 4 is the shape desired for the future window.

According to one embodiment, illustrated in FIG. 5, a cutting tool 6, with its maneuvering means 16, is coincident with the punching and insertion tool 5. Since the tool 5 is disposed on the side of the supply layer 2, the tool 5, 6 has to pass through the supply layer 2 in order to reach the receiving layer 1 so as to carry out the cut. This can be made possible by a hole 9 present in the supply layer 2. In the scope of an iterative method, such a hole 9 exists in that it results from the production of a previous pellet 3. This presumes that the dimensions of the cutting tool 6 are identical to or inscribed in the dimensions of such a hole 9 corresponding to a pellet 3. Alternatively, it is also possible for the cutting to enlarge said hole 9.

According to a variant of the above embodiment, which is more particularly suitable for "strip re-entry" and is illustrated in FIGS. 9-11, it is possible to cut the opening 9 during the same operation which inserts the pellet 3. For this purpose, the cutting tool 6 is coincident with the punching and insertion tool 5, as above.

As illustrated in FIG. 9, said single tool 5, 6 cuts the two layers 1, 2 simultaneously. In doing so, the tool 5, 6 produces a pellet 3 by cutting the supply layer 2. The tool 5, 6 continues to travel and, by pushing the pellet 3, produces the opening 9 in the receiving layer 1, producing a chip 8. This being strip re-entry, the travel is such that the tool 5, 6 and the pellet 3 protrude from the receiving layer 1.

As illustrated in FIG. 10, the travel is reversed, by pushing from bottom to top, this being realized for example by the counterpart tool 7. This second movement stops when the pellet 3 is, in terms of height, disposed exactly in the opening 9. During the pushing from bottom to top, the chip 8 follows the movement.

As illustrated in FIG. 11, the counterpart tool 7 alone is then lowered again in order to allow the ejection of the chip 8.

Such an embodiment is more particularly effective in a configuration in which the two layers 1, 2 are contiguous, i.e. for a device that does not have an intermediate die and/or clamp 11, 12, as illustrated in FIGS. 4 and 9-11.

Such an embodiment is advantageous in that a single tool 5, 6 realizes the cutting, the punching and the insertion. Moreover, the receiving layer 1 is advantageously not moved relative to the tool 5, 6 during these three operations, thereby avoiding any indexing problems. Indexing is an operation which allows the precise positioning of one layer 1 relative to the other layer 2. This complex referencing operation is advantageously avoided when relative positioning of the layers 1, 2 is retained by the method. Indexing has to be carried out in this case at the start of the method and reproduced as soon as one of the layers 1, 2 is moved with respect to the device, or as soon as a die/clamp assembly is open. The cutting tool 6 can advantageously be a flat punch. One drawback, linked with the advantage, is that the unity of the tool 5, 6 means that the dimensions of the pellet 3, in the plane of the layers 1, 2, are necessarily identical to those of the opening 4.

In order to remedy this drawback, other embodiments in which the cutting tool 6 is separate from the punching and insertion tool 5 may be envisioned.

Since the cutting tool 6 is separate, it may advantageously be disposed on the side of the receiving layer 1, as illustrated in FIGS. 6-8, thereby facilitating access to this layer 1. The separation may make it possible to carry out cutting using another principle. The tool 6 may be a flat punch, but also any other type of tool, such as a hollow punch or some other cutting tool, for example.

According to one embodiment, illustrated by two examples in FIGS. 6-8, the cutting tool 6 is coaxial with the punching and insertion tool 5. It is advantageously disposed in the opposite direction and on the other side of the receiving layer 1 and supply layer 2. The tool 6 is disposed on the side of the receiving layer 1 and works in a direction from the receiving layer 1 to the supply layer 2.

Such a disposition is advantageous in that, since the two tools 5, 6 are separate, it is possible to give them shapes, dimensions or tolerances that are different and thus to vary shapes, dimensions and/or tolerances between the opening 4, for the one part, and the pellet 3, for the other part. With identical shapes and dimensions, varying the tolerances may make it possible to vary the insertion clearance for the pellet 3 in the opening 4, in order to obtain more or less tight clamping. Moreover, the receiving layer 1 is advantageously not moved relative to the tool 5, 6 during the three operations, avoiding any indexing problems.

According to this embodiment, the cutting tool 6, which is coaxial with the tool 5, can act as a counterpart tool 7 during the insertion operation.

Such a disposition poses the problem of evacuating a chip 8 that results from the cutting of the opening 4. At least two approaches are possible.

In a first approach, illustrated in FIG. 6, the chip 8 originating from the receiving layer 1 can be evacuated through the supply layer 2. As above, this may be possible via a hole 9 present beforehand in the supply layer 2. In the scope of an iterative method, such a hole 9 may originate from the production of a previous pellet 3. This presumes, here too, that the dimensions of the cutting tool 6 are identical to or inscribed in the dimensions of such a hole 9 corresponding to a pellet 3. Alternatively, it is also possible for the cutting to enlarge said hole 9.

In another approach, illustrated in FIGS. 7-8, the chip 8 can be evacuated between the receiving layer 1 and the supply layer 2. As illustrated in FIG. 7, the chip 8 is formed between the two layers 1, 2. The punching and insertion tool 5 can be used as a counterpart tool during cutting. As illustrated in FIG. 8, the chip 8 is then evacuated by gravity, with an advantage in the vertical disposition, or by means of an ejector 14.

Such a disposition advantageously combines the advantages linked with the separation into two tools 5, 6 and the lack of indexing. Moreover, at the cost of increased complexity, the two tools 5, 6 are completely independent and do not bring about any stress between the opening 4 and the pellet 3.

It is also possible to completely separate the stations into a chain comprising a cutting station and a punching and insertion station. In this case, the receiving layer 1 is moved from station to station upon each operation, with necessary indexing each time.

Following the insertion step, the method can also comprise optional steps, such as: calendering, if necessary limited to the region of the window, addition of additional layers above and/or below the receiving layer 1, machining, engraving, embossing, printing, application of varnish or paint, etc.

In order to manufacture an ID card, the method comprises, following the insertion step, a step of laminating two transparent layers that are disposed on either side of the receiving layer. The pellet is thus held in the thickness of the ID card. During a punching and/or cutting operation, a tool comprises a penetrating means 5, 6 that is initially disposed on a first side of the layer 1, 2 to be punched/cut, a die disposed on the opposite side relative to the layer 1, 2, and preferably a clamp that is disposed on the first side and is able to immobilize the layer 1, 2 by clamping against the die.

Thus, in FIG. 2, during the operation of punching the supply layer 2, a die 12, formed by the upper surface of the part referenced 12, is in contact with the layer 2. A clamp 13 immobilizes the layer 2 by clamping it against the die 12.

Similarly, in FIG. 6, during the operation of cutting the receiving layer 1, a die 11, formed by the right-hand surface of the part referenced 11, is in contact with the layer 1. A clamp 10 immobilizes the layer 1 by clamping it against the die 11.

The roles of die and clamp depend on the direction of operation of the tool. Thus, referring to FIG. 2, for punching from top to bottom, the receiving layer 1 is disposed between a die 10 and a clamp 11 formed by the lower surface of the part referenced 11. By contrast, for punching from bottom to top, the part 11 acts as a die, while the part 10 is a clamp.

The intermediate part(s) 11, 12, as can be seen, for example, in FIGS. 2 and 6, is/are optional. As illustrated in FIG. 5, it is possible to dispose the receiving layer 1 in direct contact with the supply layer 2. In this case, for punching from top to bottom, the tool 5, 6 cooperates with the part 10 acting as a die, and the part 13 acts as a clamp.

Such a disposition advantageously simplifies the means of the method. According to the method, the supply layer 2 is moved between the cutting step and the punching step, while the receiving layer 1 is moved before the cutting step, i.e. they are moved at different times. Movement of one layer 1, 2 is rendered possible by the clamp and the corresponding die being spaced apart. The presence of an intermediate part 11, 12 makes it possible for one of the layers 1, 2 to be held while the other is free. The absence of an intermediate part 11, 12 thus brings about a risk of undesired movement of the layer that needs to remain fixed.

Following the insertion of the pellet into the receiving layer, it may be advantageous to establish a connection between this pellet and a covering layer, or external layer ("overlay"), which is preferably transparent. Thus, FIG. 12 shows a receiving layer 1 into which a pellet 3 has been inserted according to one or another of the techniques described in detail above and which is superposed on a layer 20 (the order of the layers is not very important in reality). Two circles denote regions, at the interface between the pellet and the layer 20, which have been subjected to a local thermal treatment that has resulted in local welding between the pellet and the layer 20; such a thermal treatment can take place through the layer 20 (see the wavy arrows), for example by means of a laser. This thermal treatment may be accompanied by the application of pressure. The pellet is then secured reliably and durably. This thermal treatment may, if desired, affect not only the pellet and the covering layer but also the receiving layer. It is within the capabilities of a person skilled in the art to control the thermal treatment so as to avoid any accidental local deformation.

Such securing can take place before or after lamination of the receiving layer (and any other layers) with this covering, or external, layer, preferably between two such external layers; in this way, it is possible to obtain, notably, an ID card.

The invention claimed is:

1. A method for producing a window in a receiving layer made of thin plastic by insertion of a pellet originating from a supply layer made of thin plastic, the method comprising:
    cutting an opening in the receiving layer in a shape that the window is to have,
    punching the supply layer to produce a pellet, and
    inserting the pellet into the opening, wherein said punching and at least a first phase of said inserting the pellet are realized in a single movement of a single punching and insertion tool, in a direction from the supply layer to the receiving layer,
    wherein a counterpart tool is moveable coaxially with the punching and insertion tool, and on an opposite side of the receiving layer with respect to the punching and insertion tool, and cooperates with the punching and insertion tool and prevents the pellet from extending beyond the receiving layer, in order to position the pellet in the opening.

2. The method as claimed in claim 1, wherein the punching and insertion tool comprises a flat punch.

3. The method as claimed in claim 1, wherein said inserting the pellet comprises a step of pushing the pellet through and beyond the opening in the receiving layer, followed by a step of pushing the pellet back toward the supply layer into the opening.

4. The method as claimed in claim 1, wherein a shape of the pellet is substantially identical to a shape of the opening, and a thickness of the supply layer is substantially the same as a thickness of the receiving layer.

5. The method as claimed in claim 1, wherein a material of the pellet is transparent.

6. The method as claimed in claim 1, wherein the receiving layer and supply layer are disposed horizontally.

7. The method as claimed in claim 1, wherein the receiving layer and supply layer are disposed vertically.

8. The method as claimed in claim 1, wherein said cutting the opening is performed by a cutting tool that is coincident with the punching and insertion tool and works through the supply layer.

9. The method as claimed in claim 1, wherein said cutting the opening is performed by a cutting tool that is separate from the punching and insertion tool.

10. The method as claimed in claim 9, wherein the cutting tool is coaxial with the punching and insertion tool and on the opposite side relative to the receiving layer and supply layer.

11. The method as claimed in claim 10, wherein the cutting tool and the counterpart tool are coincident.

12. The method as claimed in claim 9, wherein a cut chip is evacuated through the supply layer.

13. The method as claimed in claim 9, wherein a cut chip is evacuated between the receiving layer and the supply layer.

14. The method as claimed in claim 1, wherein the pellet is welded to a cover layer bordering the receiving layer.

15. A device obtained by a method as claimed in claim 1.

16. A method for manufacturing an ID card having at least one receiving layer and two transparent outer layers, the method comprising the steps for producing a window as claimed in claim 1, and then a step of laminating the outer layer and the at least one receiving layer.

17. The method as claimed in claim 2, wherein said inserting the pellet comprises a step of pushing the pellet through and beyond the opening in the receiving layer, followed by a step of pushing the pellet back toward the supply layer into the opening.

* * * * *